United States Patent
Da Silveira et al.

(10) Patent No.: US 9,094,254 B2
(45) Date of Patent: *Jul. 28, 2015

(54) METHOD AND APPARATUS FOR ANTENNA ARRAY CALIBRATION USING TRAFFIC SIGNALS

(71) Applicant: TELEFONAKTIEBOLAGET L M ERICSSON (PUBL), Stockholm (SE)

(72) Inventors: Marthinus Willem Da Silveira, Ottawa (CA); Neil McGowan, Stittsville (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 139 days.

This patent is subject to a terminal disclaimer.

(21) Appl. No.: 13/894,826

(22) Filed: May 15, 2013

(65) Prior Publication Data

US 2014/0133543 A1    May 15, 2014

Related U.S. Application Data

(63) Continuation-in-part of application No. 13/677,781, filed on Nov. 15, 2012.

(51) Int. Cl.
  H04Q 7/00      (2006.01)
  H04L 25/03     (2006.01)
  H04B 17/12     (2015.01)
  H04B 7/06      (2006.01)

(52) U.S. Cl.
  CPC .......... H04L 25/03949 (2013.01); H04B 17/12 (2015.01); H04B 7/06 (2013.01)

(58) Field of Classification Search
  None
  See application file for complete search history.

(56) References Cited

U.S. PATENT DOCUMENTS

| | | | |
|---|---|---|---|
| 6,615,024 B1 * | 9/2003 | Boros et al. | 455/67.14 |
| 6,963,742 B2 | 11/2005 | Boros et al. | |
| 7,209,078 B2 | 4/2007 | Jin et al. | |
| 7,292,877 B2 | 11/2007 | Yoon et al. | |

(Continued)

FOREIGN PATENT DOCUMENTS

| WO | WO-03090386 | 10/2003 |
|---|---|---|
| WO | WO-2010038227 | 4/2010 |

OTHER PUBLICATIONS

Non-Final Office Action, U.S. Appl. No. 13/677,781, dated Aug. 13, 2014, 20 pages.

(Continued)

*Primary Examiner* — Duc C Ho

(74) *Attorney, Agent, or Firm* — Nicholson De Vos Webster & Elliott, LLP

(57) ABSTRACT

An antenna array of a base station is calibrated using outbound traffic signals. The outbound traffic signals are captured for use as reference signals before the outbound traffic signals enter transmit paths in a radio unit of the base station. The outbound traffic signals are captured for use as a feedback after the outbound traffic signals exit the transmit paths. Each of the reference signals is one of the outbound traffic signals to be transmitted. An impairment estimator estimates the impairment for each of the outbound traffic signals based on the feedback signal and the reference signals. For each transmit path, a set of weights of an all-pass filter is determined, where the all-pass filter has a frequency response that approximates the impairment estimation in an occupied frequency region where reference signal power is above a threshold. The set of weights is inversed to obtain equalizer taps for each of the transmit paths.

23 Claims, 9 Drawing Sheets

(56) References Cited

U.S. PATENT DOCUMENTS

| | | |
|---|---|---|
| 8,674,874 B2 * | 3/2014 | Soualle et al. ............... 342/174 |
| 2004/0132414 A1 | 7/2004 | Sendyk et al. |
| 2004/0204109 A1 | 10/2004 | Hoppenstein |
| 2004/0214604 A1 | 10/2004 | Yoon et al. |
| 2006/0240784 A1 | 10/2006 | Naguib et al. |
| 2007/0177620 A1 | 8/2007 | Ohmuro et al. |
| 2007/0230638 A1 * | 10/2007 | Griniasty ..................... 375/347 |
| 2008/0159357 A1 | 7/2008 | Nekoogar et al. |
| 2008/0225929 A1 | 9/2008 | Proctor et al. |
| 2012/0001810 A1 | 1/2012 | Soualle et al. |

OTHER PUBLICATIONS

International Search Report and Written Opinion, Application No. PCT/IB2013/060067, dated Jan. 23, 2014, 10 pages.

International Search Report and Written Opinion, Application No. PCT/IB2013/060066, dated Jan. 23, 2014, 10 pages.

* cited by examiner

METHOD AND APPARATUS FOR ANTENNA ARRAY CALIBRATION USING TRAFFIC SIGNALS

CROSS-REFERENCE TO RELATED APPLICATIONS

This application is a continuation-in-part application of and claims the priority of U.S. application Ser. No. 13/677,781 filed on Nov. 15, 2012, which is hereby incorporated by reference.

TECHNICAL FIELD

Embodiments of the invention relate to antenna array calibration; and more specifically, to antenna array calibration using outbound traffic signals to be transmitted by a radio base station (RBS).

BACKGROUND

Antenna arrays have been widely used in wireless mobile networks for directional signal transmission and reception with an increased gain compared to an omni-directional antenna. The increased gain translates into a higher cell density and data throughput. An antenna array needs to be calibrated across its sub-array paths to remove any linear phase and/or amplitude distortions (hereafter simply referred to as phase distortion) in these paths. If the transmission beam pattern is out of phase or otherwise phase-distorted, the signal transmitted by a base station at normal transmission power may not be correctly received and decoded by a user terminal. To compensate for the phase distortions, the base station may transmit data at a higher power level; however, increasing the transmission power acts as a load to the system, causing a reduction to the power that can be allocated to other terminals. In addition, the signal transmitted at higher power may interfere with other terminals, causing a reduction in signal quality.

One existing technique for antenna array calibration uses special calibration signals injected into the transmit path of the base station. The special calibration signals may interrupt and/or degrade the normal outbound traffic signals, which can negatively impact the network capacity and data throughput. Additionally, there are currently a wide variety of base stations that have different system configurations with multiple standards and multiple carriers. The use of the special calibration signals by these base stations may result in standards non-compliance and/or violate regulatory requirements.

SUMMARY

Embodiments of the invention calibrate an antenna array of a base station using outbound traffic signals. The calibration removes distortion incurred by the transmit paths in a base station. The antenna array includes a plurality of sub-arrays coupled to the transmit paths for transmitting outbound traffic signals to a wireless network.

In one embodiment, a method of calibration of the antenna array using outbound traffic signals is disclosed. The method comprises capturing the outbound traffic signals for use as a feedback after the outbound traffic signals exit the transmit paths, and capturing the outbound traffic signals for use as reference signals before the outbound traffic signals enter the transmit paths. Each of the reference signals is one of the outbound traffic signals that is to be transmitted via one of the sub-arrays. The method further comprises performing an impairment estimation for each of the outbound traffic signals based on the feedback and the reference signals, and determining, for each transmit path, a set of weights of an all-pass filter. The all-pass filter has a frequency response that approximates the impairment estimation in an occupied frequency region where signal power of the reference signals is above a threshold. The method further comprises inversing the set of weights to obtain equalizer taps for each of the transmit paths, and applying the equalizer taps to the outbound traffic signals before the outbound traffic signals enter the transmit paths to thereby remove the distortion incurred by the transmit paths.

In another embodiment, a network node functioning as a base station that performs calibration of the antenna array using outbound traffic signals is disclosed. The base station comprises a combiner in the antenna array that combines the outbound traffic signals in the sub-arrays into a feedback. The outbound traffic signals are captured for use as reference signals before the outbound traffic signals enter the transmit paths in a radio unit of the base station. Each of the reference signals is one of the outbound traffic signals that is to be transmitted via one of the sub-arrays. The base station further comprises an impairment estimator that estimates the impairment for each of the outbound traffic signals based on the feedback and the reference signals, a synthesizer that determines, for each transmit path, a set of weights of an all-pass filter and inverses the set of weights to obtain equalizer taps for each transmit path. The all-pass filter has a frequency response that approximates the impairment estimation in an occupied frequency region where signal power of the reference signals is above a threshold. The base station further comprises a plurality of equalizers with one equalizer for each transmit path. Each equalizer is adapted to apply the equalizer taps to the outbound traffic signals for one of the transmit path before the outbound traffic signals enter the transmit paths to thereby remove the distortion incurred by the transmit paths.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DESCRIPTION OF EMBODIMENTS

Figure 1:
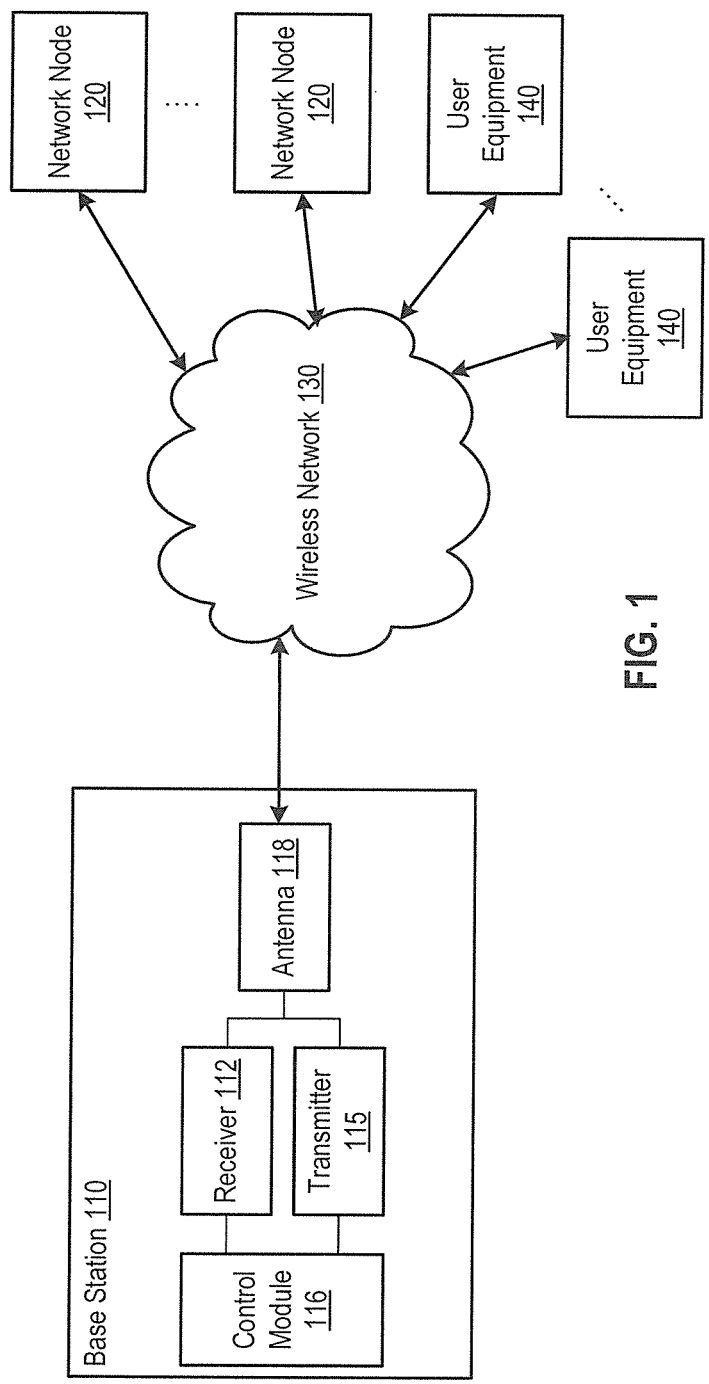
FIG. 1 illustrates an example of a wireless network environment in which an embodiment of the invention may operate.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Embodiments of the invention provide for an antenna array calibration technique that uses normal outbound traffic signals for calibration. The term "outbound traffic signals," as used herein, refers to the traffic signals that are to be transmitted from the antenna array to other network nodes or user equipment. The technique calibrates the antenna array in the transmit direction. The calibration technique does not use any special calibration signal injected into the base station (e.g., a radio base station (RBS)). This allows an RBS to be in full compliance with applicable standards. As normal outbound traffic signals are used for calibration, the calibration does not interrupt or interfere with the ongoing traffic signals, and therefore does not impact system availability and signal quality. In addition, as the calibration does not incur interruption of normal system operation, the calibration can be performed at all times to account for changes in operating conditions such as temperature changes.

In one embodiment, the calibration can be performed entirely within the radio unit of a base station using the feedback signal from the antenna module, without involving other parts of the base station and the network. Confining the calibration within the radio unit can simplify the hardware and software design and lower the cost of the system. Moreover, the radio unit in a base station is typically multi-standard, which also means that the radio unit is agnostic to the specific radio standard (i.e., Long Term Evolution (LTE), Global System for Mobile Communications (GSM), Code Division Multiple Access (CDMA), Wideband CDMA (WCDMA), etc.) being implemented by the base station. Therefore, performing the calibration in the radio unit maintains the multi-standard characteristic of the base station. It is to be appreciated that embodiments of the invention are not so limited; in some embodiments, the calibration can be performed by the radio unit and other parts of the base station, e.g., the baseband unit. However, the digital circuitry in the baseband unit is generally multi-standard in hardware, but typically uses unique software and configuration specific to each radio standard. Moreover, performing the calibration in the radio unit and the baseband unit may incur additional interconnects and coordination between these two units. Therefore, performing the calibration in the baseband unit or multiple units of the base station may be more costly than performing the calibration entirely in the radio unit. The calibration technique described herein may be implemented in both time-division duplex (TDD) and frequency-division duplex (FDD) systems.

According to one embodiment, the antenna array described herein combines outbound traffic signals across multiple transmit paths to form a feedback signal. In addition, the outbound traffic signals are captured before they enter the transmit paths as a set of reference signals. The feedback signal is then de-convolved with the set of reference signals to determine an impairment transfer function for each of the transmit paths. Based on the impairment transfer function, a set of equalizer weights are computed for each transmit path to correct for the impairments.

The calibration technique described herein is flexible and can be used under a large range of system conditions, such as wide bandwidth, multiple carriers and multiple technologies. The calibration technique significantly improves system performance even with low signal-to-noise ratio in the feedback signal. The calibration technique can automatically handle large relative delay differences between the transmit paths. In addition, the calibration technique can automatically handle a system with ill-conditioned (i.e., correlated) transmit signals. Thus, it is not necessary to coordinate the calibration with any other parts of the RBS or network activities.

FIG. 1 illustrates an example of a network architecture in which an embodiment of the invention may operate. A base station 110, such as an RBS, is coupled to one or more network nodes 120 (e.g., other base stations) and/or user equipment 140 (e.g., mobile phones) via a wireless network 130. The wireless network 130 operates in compliance with a wireless communication standard, such as LTE, GSM, CDMA, WCDMA, etc. The base station 110 includes a receiver module 112, a transmitter module 115, both of which are coupled to an antenna module 118 for signal transmission and reception. The receiver module 112 and the transmitter module 115 may also be coupled to a controller module 116 that controls the transmission and reception operations. It is understood that the base station 110 of FIG. 1 is a simplified representation; additional circuitry may be included in a base station that performs the antenna array calibration described herein.

Figure 2:
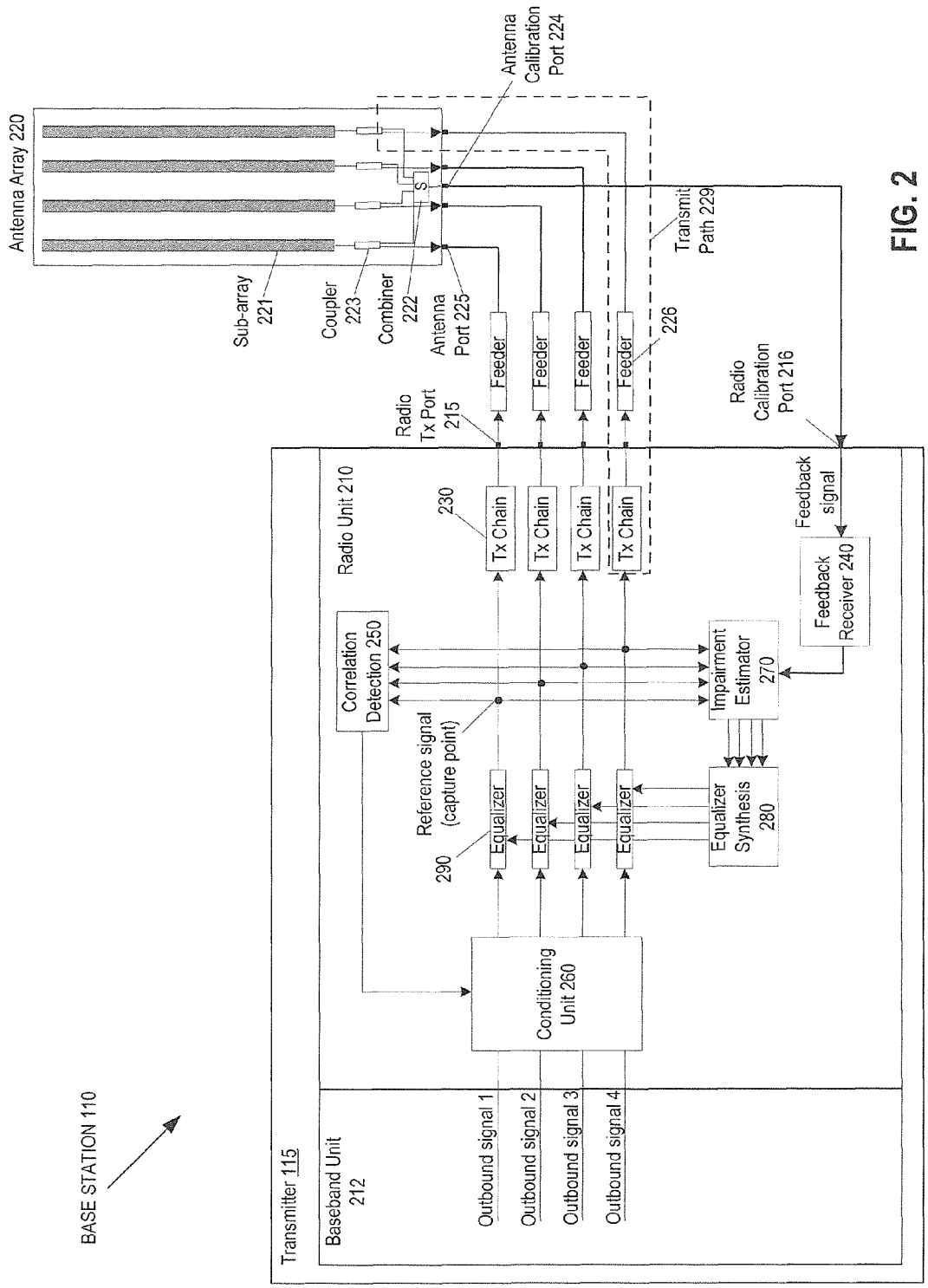
FIG. 2 is a block diagram illustrating antenna array calibration using outbound traffic signals according to one embodiment.

FIG. 2 illustrates a diagram of a portion of the transmitter module 115 in the base station 110 that performs antenna array calibration according to one embodiment. In this embodiment, the transmitter module 115 includes a radio unit 210 and a baseband unit 212 coupled to an antenna array 220 (corresponding to the antenna module 118 of FIG. 1) that has multiple sub-arrays 221. Although four sub-arrays 221 are shown in this embodiment, it is understood that any number of sub-arrays may be used. The four sub-arrays 221 carry four outbound traffic signals that have been phase-controlled for transmission. Each of the outbound traffic signals is a "normal traffic signal" (or simply referred to as "traffic signal") as the signal carries data or other communication information for transmission to another network node or user equipment. The sub-arrays 221 are coupled to the radio unit 210 of the base station 110 via respective antenna ports 225 and corresponding radio transmit ports 215 at the radio unit 210. Between the antenna ports 225 and the radio transmit ports 215 are multiple feeders 226, one for each transmit path. The term "transmit path" as used herein refers to the path traversed by an outbound traffic signal after the signal enters a transmit (Tx) chain 230 and before the signal enters a sub-array 221. An example of a transmit path is shown in FIG. 2 by the dotted box labeled as a transmit path 229. The transmit path 229 includes a transmit (Tx) chain 230 and all of the interconnect including a feeder 226 up to a coupler 223 inside the antenna array 220. In practice the transmit path 229 may also include duplexers, amplifiers (e.g., tower mounted amplifiers (TMAs), combiners, diplexers, etc., such as would be appreciated by one skilled in the art. There is a one-to-one correspondence between a transmit chain and a transmit path.

To perform antenna array calibration, the outbound traffic signals are coupled by respective couplers 223 and combined (i.e., summed up) by a combiner 222 in the antenna array 220 to produce a feedback signal. The combiner 222 combines the outbound traffic signals from all of the sub-arrays 223 into a single feedback signal. This feedback signal is routed to a feedback receiver 240 through an antenna calibration port 224 and a corresponding radio calibration port 216 at the radio unit 210.

The radio unit 210 is responsible for converting baseband signals into radio frequency (RF) signals for transmission. The radio unit 210 includes the transmit chains 230, one for each transmit path. The transmit chains 230 are the boundary between digital processing and analog processing in the base station 110, as each transmit chain 230 converts an outbound traffic signal from digital to analog. Each transmit chain 230 includes a number of analog components, such as one or more digital-to-analog converters, mixers, filters, power amplifiers, etc. These analog components in the transmit chains 230, together with the feeders 226 and other components along the analog portion of the transmit paths up to the antenna ports 225, generally incur linear phase and/or linear amplitude impairment to the outbound traffic signals. Significant non-linearities in the transmit path (such as the power amplifier) are typically taken care of by non-linear pre-distortion techniques.

To calibrate and compensate for the linear impairment of phase and/or amplitude, normal outbound traffic signals in the transmit paths are simultaneously captured in the radio unit 210 before these signals enter the transmit chains 230. These captured signals are used as reference signals, each of which is an outbound traffic signal to be transmitted by one of the transmit chains 230 via one of the sub-arrays 221. The outbound traffic signals at the capture point have not been impaired by the analog components in the transmit paths, and, therefore, are suitable for serving as reference signals. The feedback signal, on the other hand, is formed after each outbound traffic signal has gone through the analog portion of the transmit path. Thus, the feedback signal is a sum of the impaired outbound traffic signals. The calibration technique described herein uses the unimpaired reference signals and the impaired sum of the traffic signals to estimate the impairment in the transmit path and to thereby remove the impairment from the outbound traffic signals. In some cases, only the differences in the impairments of the transmit paths need to be removed from the outbound traffic signals to obtain good system performance.

The feedback signal from the combiner 222 is sent to the feedback receiver 240, which down-converts and digitizes the feedback signal to produce a digitized feedback signal. The digitized feedback signal is sent to an impairment estimator 270 to be processed with the reference signals.

In one embodiment, the impairment estimator 270 aligns the feedback signal with the reference signals in time, and performs a de-convolution of the reference signals jointly with the feedback signal. The result of the de-convolution is an estimated impairment for each transmit path. As the effect of impairment is equivalent to convolving the reference signals with the impairment, the impairment may be calculated by de-convolving the reference signals with the impaired feedback signal. Examples of the de-convolution computation will be described in detail below with reference to FIG. 3 and FIG. 4. The de-convolution can be solved by direct or iterative methods.

Based on the estimated impairment from the impairment estimator 270, an equalizer synthesis unit 280 computes an approximate inverse to the impairment in the frequency range occupied by the outbound traffic signals. The equalizer synthesis unit 280 produces a set of equalizer taps representative of the approximate inverse to the impairment. The equalizer synthesis unit 280 then sets the tap values of the corresponding equalizers 290 according to the equalizer taps. In one embodiment, each equalizer 290 is a complex finite impulse response (FIR) filter with one or more taps (i.e., equalizer taps). The finite impulse response is an approximate inverse to the transfer function of impairment in the transmit path from the transmit chain 230 to the antenna port 225. As such, each outbound traffic signal processed by the equalizer 290 is pre-distorted such that the pre-distortion cancels out the impairment in the transmit path.

In one embodiment, the base station 110 also includes a correlation detection unit 250 to detect a degree of correlation between the outbound traffic signals. The correlation detection may be performed by a cross-correlation computation between each outbound traffic signal and all of the other outbound traffic signals. If the correlation between any pair of the outbound traffic signals exceeds a predetermined threshold, the correlation detection unit 250 may activate a conditioning unit 260 on the transmit paths to condition the outbound traffic signals. If the correlation is below the threshold, the outbound traffic signals may bypass the conditioning unit 260, or may de-activate the conditioning unit 260 from performing signal conditioning. In one embodiment, the conditioning unit 260 conditions the outbound traffic signals before the outbound traffic signals enter the equalizers 290 before the outbound traffic signals enter the equalizers 290.

In one embodiment, if the correlation of the outbound traffic signals exceeds the threshold, then the outbound traffic signals may be conditioned by slight phase and/or amplitude variations as a function of time. This amounts to wobbling the spatial antenna patterns slightly over time. The slight phase and/or amplitude variation reduces the correlation. The slight phase and/or amplitude variation is transparent to other network nodes and user equipment that are in communication with the base station 110, as these network nodes and user equipment can equalize and compensate for this slight variation.

There are many different options for implementing the phase and/or amplitude variations. In one embodiment, a low power replica is added to each outbound traffic signal, or to the outbound traffic signal that is found to be correlated with another outbound traffic signal. One or more of the following can be applied to the low power replica: a) A small unique frequency offset is applied to some or all low power replicas as appropriate. b) A small unique delay offset is applied to some or all low power replicas as appropriate. c) A unique filter is applied to some or all low power replicas as appropriate. It is understood that embodiments are not so restricted and other phase and/or amplitude variations may be used.

In the general case where the outbound traffic signals to the multiple antenna branches are not correlated (e.g., not exceeding a predetermined threshold), the calibration technique described with reference to FIG. 2 is able to make use of actual traffic signals carrying live traffic for calibration, thus avoiding the injection of specially created calibration signals. Therefore, the error vector magnitude (EVM) of the outbound traffic signals is not degraded since the signals are not being interrupted by injected calibration signals. In addition, because the calibration technique described herein has no or negligible impact on the signal EVM, antenna calibration can be performed on an ongoing basis while in service with minimal service impact. In the special case where the outbound traffic signals to the multiple antenna branches are multicarrier and are correlated (e.g., exceeding a predetermined threshold) as in beam-forming applications, the calibration technique described herein provides a conditioning solution that has no or negligible impact on the signal EVM since the recipient node/device can equalize and compensate for this slight phase offset.

Although FIG. 2 shows that the calibration functions are performed entirely in the radio unit 210, some or all of the calibration functions can be performed in the baseband unit 212 of the base station 110. In some embodiments, the calibration functions may be performed in the radio unit 210, the baseband unit 212, and/or other portions of the base station 110.

In one embodiment, the impairment estimation and equalization are performed in a continuous loop, where the feedback signal and reference signals are continuously captured over time and are continuously used to refine the equalizer taps. The computation of impairment estimation and equalization can be performed offline or in real-time. For example, a block of reference signals captured over a period of time may be used in offline processing in order to obtain an accurate impairment estimation and equalization. Alternatively, real-time processing may be more responsive to changes in operating conditions. In some embodiments, the base station 110 may dynamically switch between offline and real-time processing based on the current operating conditions.

In the following, examples of impairment estimation and equalization are described. In one embodiment, the impairment estimation is performed by de-convolution of the reference signals and the feedback signal. As described above with reference to FIG. 2, the de-convolution may be computed by the impairment estimator 270, and the de-convolution result is the estimated impairment.

Figure 3:
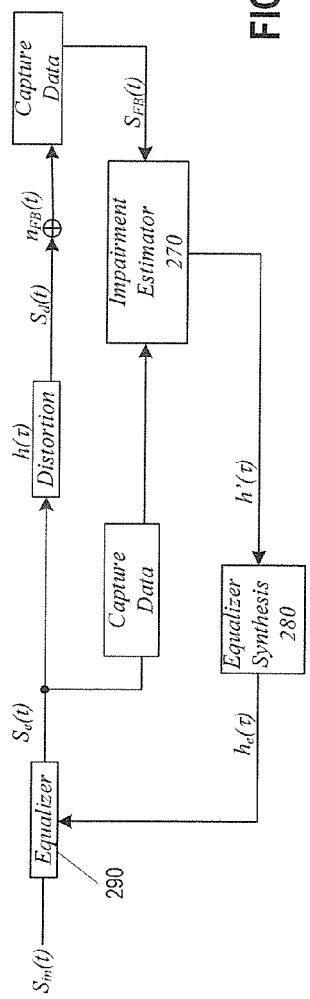
FIG. 3 illustrates an example of de-convolution computation in a transmitter having a single transmit path according to one embodiment.

FIG. 3 illustrates an example of de-convolution computation for a radio unit having only one transmit path according to one embodiment. Assume that $S_e(t)$ is the outbound traffic signal, $h(\tau)$ is the transmit path impairment impulse response, $n_{FB}(t)$ is Gaussian noise in the feedback path and $S_{FB}(t)$ is the feedback signal. The feedback signal can be written as: $S_{FB}(t)=h(\tau)*S_e(t) n_{FB}(t)$, where * is the convolution operation.

As $h(\tau)*S_e(t)=S_{FB}(t)-n_{FB}(t)$, the estimated impairment can be found as: $h'(\tau)=[S_{FB}(t)-n_{FB}(t)]*^{-1}S_e(t)$, where $*^{-1}$ is the de-convolution. This de-convolution can be solved directly by division in the frequency domain or by iterative de-convolution algorithms such as the iterative least mean squares (LMS). Computation of the de-convolution may be performed by a general-purpose processor executing de-convolution, a special-purpose hardware device (e.g., an Application-Specific Integrated Circuit (ASIC)), firmware, or a combination of the above. The estimated impairment $h'(\tau)$ can be fed into the equalizer synthesis unit 280 to compute an approximate inverse $h_e(\tau)$ of the impairment for use in the equalizer 290.

Figure 4:
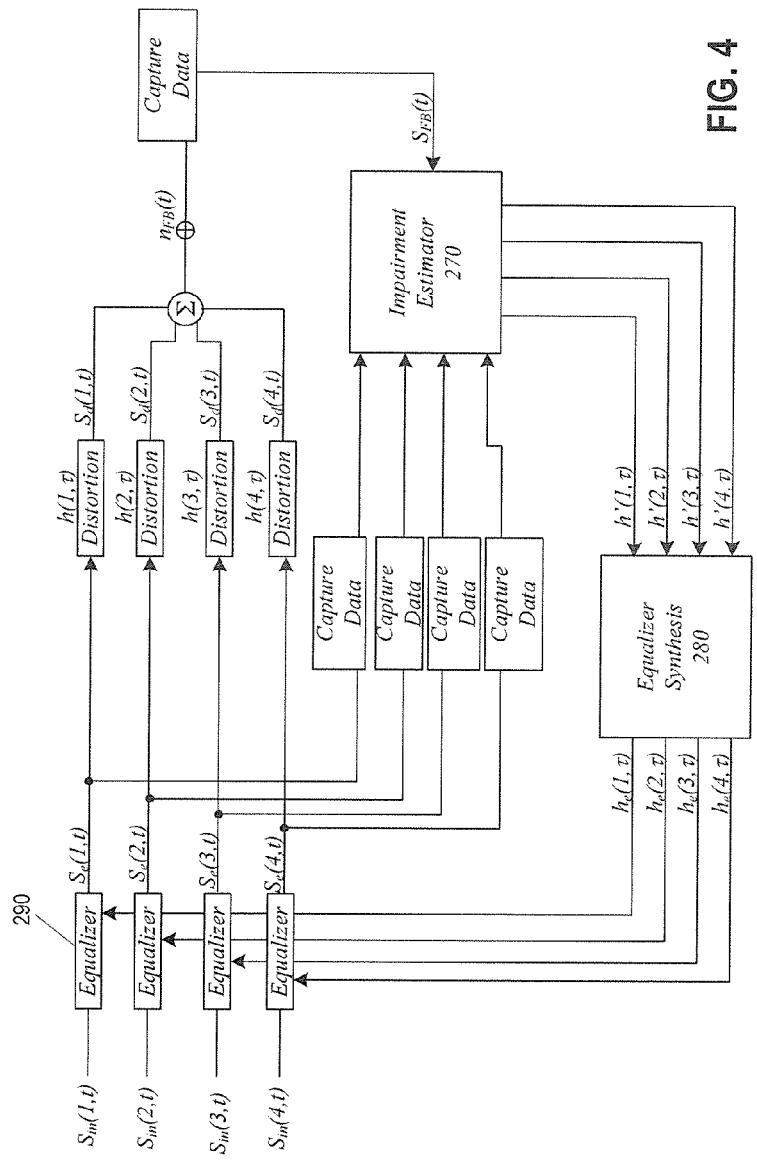
FIG. 4 illustrates an example of de-convolution computation in a transmitter having multiple transmit paths according to one embodiment.

FIG. 4 illustrates an example of de-convolution computation for a radio unit having p transmit paths according to one embodiment. Assume that $S_e(m,t)$ is the $m^{th}$ traffic signal, $h(m,\tau)$ is the impairment impulse response of the $m^{th}$ transmit path, $n_{FB}(t)$ is Gaussian noise in the feedback path and $S_{FB}(t)$ is the combined feedback signal.

Assuming that there are four transmit paths, P=4, the feedback signal $S_{FB}(t)$ can be written as:

$$S_{FB}(t)=h(1,\tau)*S_e(1,t)+h(2,\tau)*S_e(2,t)+h(3,\tau)*S_e(3,t)+h(4,\tau)*S_e(4,t)+n_{FB}(t),$$

where * is the convolution operator.

The estimated impairments $h'(1,\tau),h'(2,\tau),h'(3,\tau),h'(4,\tau)$ can be found as:

$$[h'(1,\tau),h'(2,\tau),h'(3,\tau),h'(4,\tau)]=[S_{FB}(t)-n_{FB}(t)]*^{-1}[S_e(1,t),S_e(2,t),S_e(3,t),S_e(4,t)],$$

where $*^{-1}$ is a joint de-convolution operator. This joint de-convolution can be solved directly by a pseudo-inverse in the frequency domain or with iterative algorithms such as the iterative least mean squares (LMS). Computation of the joint de-convolution may be performed by a general-purpose processor executing joint de-convolution, a special-purpose hardware device (e.g., an Application-Specific Integrated Circuit (ASIC)), firmware, or a combination of the above. The estimated impairment $h'(1,\tau),h'(2,\tau),h'(3,\tau),h'(4,\tau)$ can be fed into the equalizer synthesis unit 280 to compute an approximate inverse $h_e(1,\tau),h_e(2,\tau),h_e(3,\tau),h_e(4,\tau)$ of the impairment for use in the equalizers 290.

The joint de-convolution described in FIG. 4 is computed "jointly" with respect to the four reference signals, and is different from computing four individual de-convolutions separately. In one embodiment, four or more blocks of time domain data are captured for each of the reference signals and the feedback signal, where each block of data contains a time series of the signal sampled over a period of time. These blocks of data are converted to the frequency domain. For each frequency bin in the frequency domain, each block of captured data can be used to construct a linear equation having four unknown impairments. Thus, the four or more blocks of captured data can be used to construct a linear system of four or more linear equations having the four unknown impairments. With these four or more equations, the impairment estimator 270 can compute a matrix inverse (in the case of four equations) or pseudo-inverse (in the case of more than four equations) to solve for the four impairment unknowns per frequency bin. Using more than four equations may average out the noise on the feedback signal and thereby improve the signal-to-noise ratio. The frequency domain solutions may be converted back to the time domain to obtain the estimated impairment $h'(1,\tau),h'(2,\tau),h'(3,\tau),h'(4,\tau)$.

In the embodiment described above, the feedback signal is formed by combining the outbound traffic signals from all of the sub-arrays 223 (FIG. 2). In an alternative embodiment, the outbound traffic signals, without being combined, can be used as feedback signals. In this alternative embodiment, an independent de-convolution is performed per transmit path 229 instead of a joint de-convolution. In some embodiments, there is a coupler at the output of the radio unit 210 for each transmit path 229, and the calibration is performed only up to these couplers. Separate equations are formed for each transmit path 229 with P=1. The computations to be described below are the same with P=1 for each transmit path 229.

Figure 5:
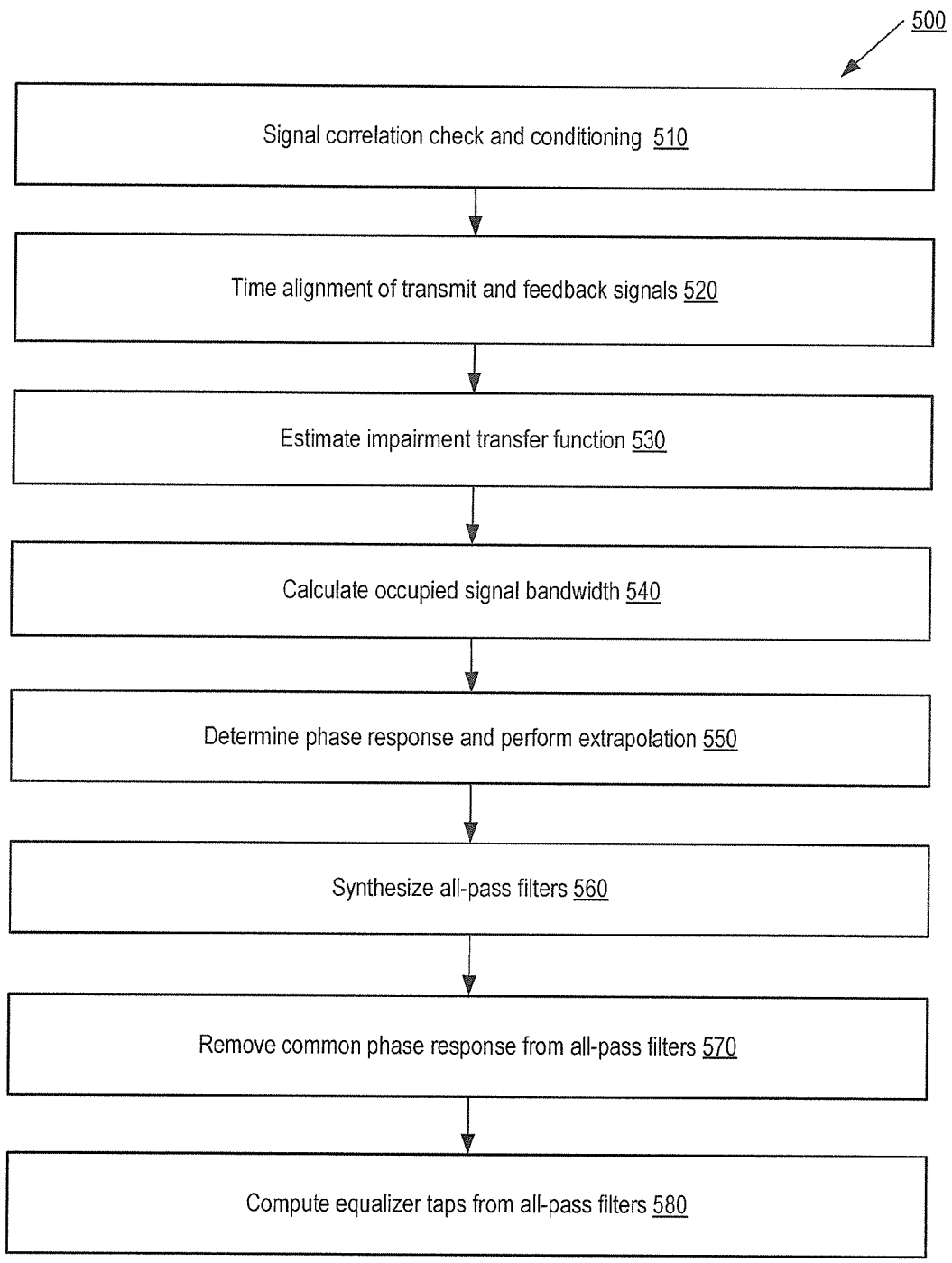
FIG. 5 is a flow diagram illustrating an overview of a calibration process according to one embodiment.

The following description provides further details of the calibration process. FIG. 5 is a flow diagram illustrating an overview of a calibration process according to one embodiment. The calibration process is used to determine the required equalizer taps. The steps are as follows:

Step 1: Signal correlation check and conditioning (block 510).

Step 2: Time alignment of transmit and feedback signals (block 520).

Step 3: Estimate impairment transfer function (block 530).

Step 4: Calculate occupied signal bandwidth (block 540).

Step 5: Determine phase response and perform extrapolation (block 550).

Step 6: Synthesize all-pass filters (block 560).

Step 7: Remove common phase response from all-pass filters (block 570).

Step 8: Compute equalizer taps from all-pass filters (block 580).

Figure 6:
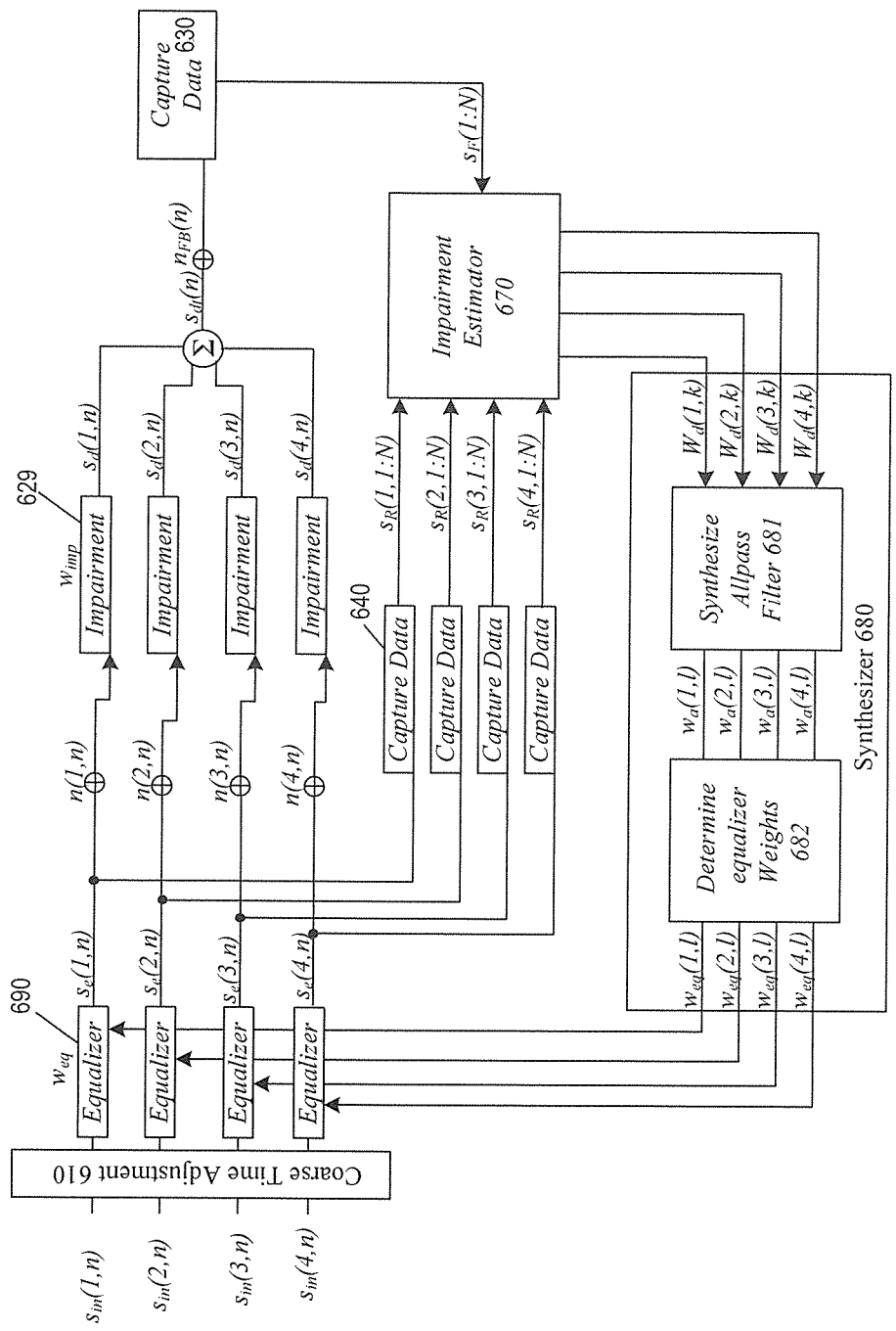
FIG. 6 is a block diagram illustrating a high-level overview of calibration modules according to one embodiment.

Before describing the details of each of the steps, a high-level description of the calibration process is provided with reference to the embodiment of FIG. 6. In this embodiment, the baseband transmit signals $s_{in}(p,n)$ are processed for calibration and transmission. The notation p is the transmit path index $p=\{1, 2, \ldots, P\}$ where P is the total number of transmit paths, and n is the time-domain sample index $n=\{1, 2, \ldots, N\}$, where N is the number of data samples in each data block. In this example, P=4. Further, in the description below, the lower-case letters indicate time-domain signals or values, and the upper-case letters indicate frequency-domain signals or values.

In one embodiment, the transmit signals $s_{in}(p,n)$ are input into a coarse time adjustment unit 610 to align the timing among the transmit signals; alternatively, the time alignment may be performed after equalization and before impairment estimation. After the transmit signals $s_{in}(p,n)$ are compensated for distortion by a set of P equalizers 690, the equalized transmit signals $s_e(p, n)$ are captured by capture data blocks 640 and stored as $s_R(p,1:N)$, where N is the length of each time-domain vector. These captured signals are then used in the calibration process as reference signals.

Referring to FIG. 6 and also to FIG. 2, the equalizer outputs $s_e(p,n)$ are typically processed by up-sampling, multicarrier combining, up-conversion and power amplification along a transmit path (indicated as "impairment" 629) before being connected to a duplexer unit (not shown). The duplexer output signals $s_d(p,n)$ are connected to the antenna ports (e.g., the antenna ports 225 of FIG. 2) via feeder cables (e.g., the feeders 226) which may also include other units containing filters such as diplexers and TMAs. The transmit signals are coupled and then combined in the antenna array 220. The combined signal $s_{dt}(n)$ is sent to the radio unit 210 for calibration via a calibration feedback cable. Along the way from the output of the equalizers 690 to capture data block 630, various noises (e.g., n(p,n) and $n_{FB}(n)$) are added to the captured feedback signals. By design the transfer function of all of the couplers 223 and interconnect to the combiner 222 in the antenna array 220 are the same or known within a specified tolerance.

In the radio unit 210, the feedback signal is down-converted and then captured as $s_F(n)$ (which can also be represented as a length-N vector $s_F(1:N)$) for calibration processing. All of the reference signals $s_R(p, n)$ and the feedback signal $s_F(n)$ are captured at the same time or otherwise aligned in time.

The feedback signal is composed of all of the transmit path signals:

$$s_F(n) = \sum_{p=1}^{P} [s_{in}(p, n) * w_{eq}(p, l) * w_{imp}(p, n)], \quad \text{(Equation 1)}$$

where $w_{eq}(p,l)$ represents the equalizer taps, $l=\{1, 2, \ldots, L\}$, $w_{imp}(p,n)$ represents the impairment transfer function, L is the number of taps in each equalizer, and the symbol * represents convolution.

Referring again to the calibration process of FIG. 5 and the block diagram of FIG. 6, each of the calibration steps is described in detail in the following sections.

Step 1: Signal Correlation Check and Conditioning. In Step 1, the auto-correlation between the transmit signals is computed. If the auto-correlation exceeds a pre-defined maximum, the transmit signals are conditioned. In one embodiment, transmit signals can be conditioned by the equalizers 690, one or more of which add a small smooth phase variation as a function of time so that the relative phase between transmitters is changing between the captured transmit signals. This phase variation can be made such that it can be removed by user equipment as part of normal channel estimation processing and therefore has no impact to system throughput.

To add the phase variation, in one embodiment, the equalizer taps $w_{eq\_current}$ for each transmit signal can be modified by a conditioned phase $\phi_{cond}$ to produce a new set of equalizer taps: $w_{eq}=\text{IFFT}(\text{FFT}(w_{eq\_current})e^{j\Phi_{cond}})$.

Step 2: Time Alignment of Transmit and Feedback. In Step 2, the transmit signals are aligned during carrier setup to within a baseband sample time. As illustrated in FIG. 6, the alignment of the transmit signals can be performed by the coarse time alignment 610 at the input end of the equalizers 690. Alternatively, the alignment of the transmit signals can be performed at the output end of the equalizers 690. The coarse time alignment 610 can be implemented by an early-late correlator, which includes a first-in-first-out (FIFO) buffer. The timing among the transmit signals can be adjusted by adjusting the FIFO length. The coarse time alignment only needs to be done once on the transmit signals. Finer timing adjustment can be performed by the equalizers 690. Additionally, the feedback signals also needs to be aligned with the transmit signals; for example, to a fractional delay of at least a quarter of the baseband sample time. In one embodiment, the feedback signal only needs to be aligned with one transmit signal after the transmit signals are aligned in time.

Step 3: Estimate Impairment Transfer Function. In Step 3, an impairment estimator 670 performs impairment estimation based on the feedback signal $s_F(n)$ and the reference signals $s_R(p,n)$. The feedback signal given in equation (1) is a combination of the convolution of the each transmit signal with its associated transmit impairment. In the case of one transmit path, the impairment can be found by the de-convolution of the feedback signal with the transmit signal. In the case of a single transmit path, the de-convolution is simply the division of the feedback signal with the transmit signal in the frequency domain. However, this division is only exact in the case of finite signals. In the case of a captured portion of a continuous signal, a time-domain window needs to be applied on each equalized transmit signal (which is the captured reference signal with current estimated equalizer applied to it), as well as on the feedback signal before performing the de-convolution. The window applied on the equalized transmit signals and the feedback signal can be a Hamming raised cosine window or another similar window. A Hamming raised cosine window is: $f_w(n)=0.54-0.46 \cos(2\pi n/(N-1))$, for $n=1, 2, \ldots, N$.

Figure 7:
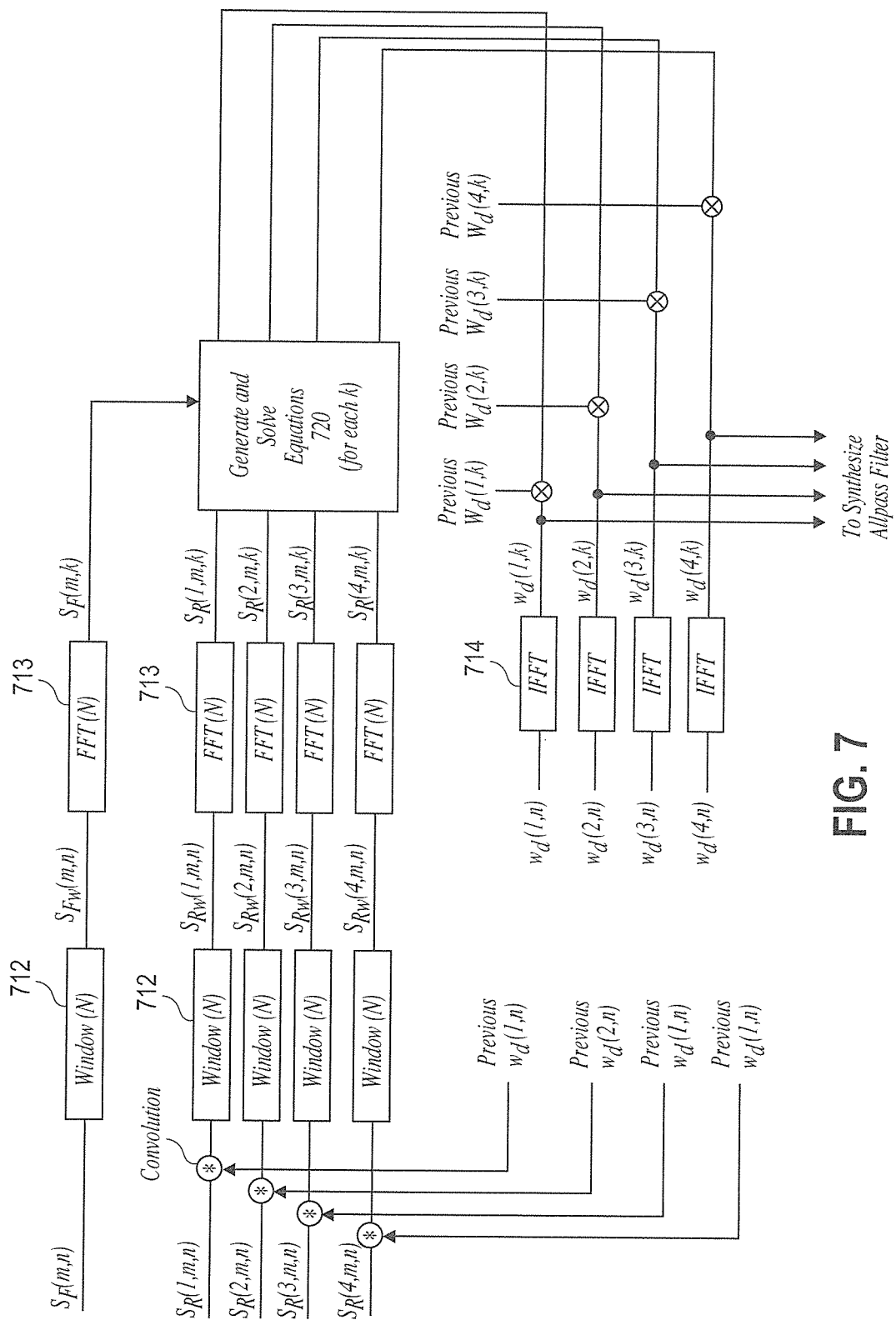
FIG. 7 is a block diagram illustrating an example of an impairment estimator according to one embodiment.

FIG. 7 is a block diagram illustrating an example of the impairment estimator 670 according to one embodiment. The impairment estimator 670 may perform a time adjustment to align the feedback signal with one or more reference signals. As there are multiple transmit paths, the impairments are found by performing a joint de-convolution of the feedback signal and the multiple reference signals.

Initially, the impairment estimator 670 convolves the reference signals with the previous impairment estimates. This convolution removes the errors incurred by windowing of the feedback signal (which has impairment) and windowing of the reference signal (which initially has no impairment). A window 712 (e.g., a Hamming raised cosine window) is applied to each of the equalized transmit signals (i.e., the reference signals) and the feedback signal. An N-point FFT 713 is then applied to the reference and feedback signals to obtain a frequency domain representation. The frequency domain signals are used to perform joint de-convolution by a Generate and Solve Equations block 720 which will be described below.

In the example of FIG. 7, the feedback signal is represented as $s_F(m,n)$ and the reference signals are represented as $s_R(p,m,n)$. The notation m is a data block index with $m=1, 2, \ldots, M$, where M is the number of data blocks collected for the purpose of calibration. Each data block has N data samples. For example, if $N=128$ and $M=20$, then twenty 128-point FFTs are performed on the time-domain data samples, and the resulting frequency domain data can be used to calculate the impairment estimation in the frequency domain.

The Generate and Solve Equation block 720 generates an over-determined system of linear equations and solves for an impairment vector (which includes P impairment values) for each frequency bin k. The linear equation for each frequency bin k, data block index m and $P=4$ can be written as follows:

$$S_R(1, m, k)W_d(1, k) + S_R(2, m, k)W_d(2, k) +$$
$$S_R(3, m, k)W_d(3, k) + S_R(4, m, k)W_d(4, k) = S_F(m, k)$$

The number of data blocks M determines the number of linear equations. The value M can be any integer number greater than P; for example, $M=20$.

This linear equation has four unknown coefficients $W_d(p, k)$ for the P transmit paths (that is, one impairment value for each transmit path). In order to solve for $W_d(p,k)$, four or more independent equations are required. This can be achieved by using different data blocks with index $m=\{1, 2, \ldots, M\}$. The equations in matrix form for each frequency bin k is as follows:

$$S_R(k)W_d(k) = S_F(k),$$

where $S_R(k) = \begin{bmatrix} S_R(1,1,k) & S_R(2,1,k) & S_R(3,1,k) & S_R(4,1,k) \\ S_R(1,2,k) & S_R(2,2,k) & S_R(3,2,k) & S_R(4,2,k) \\ S_R(1,3,k) & S_R(2,3,k) & S_R(3,3,k) & S_R(4,3,k) \\ S_R(1,4,k) & S_R(2,4,k) & S_R(3,4,k) & S_R(4,4,k) \\ \vdots & \vdots & \vdots & \vdots \\ \vdots & \vdots & \vdots & \vdots \\ S_R(1,M,k) & S_R(2,M,k) & S_R(3,M,k) & S_R(4,M,k) \end{bmatrix}$ -continued $$W_d(k) = \begin{bmatrix} W_d(1, k) \\ W_d(2, k) \\ W_d(3, k) \\ W_d(4, k) \end{bmatrix}$$

and $$S_F(k) = \begin{bmatrix} S_F(1, k) \\ S_F(2, k) \\ S_F(3, k) \\ S_F(4, k) \\ \vdots \\ \vdots \\ S_F(M, k) \end{bmatrix}$$

The estimated impairment vector for each frequency bin k is then $W_d(k)=S^+(k)S_R(k)$, where $S^+(k)$ is the pseudo inverse of $S_F(k)$. The pseudo inverse can be obtained by direct methods such as: (1) Matrix inversion, where $S^+_F(k)=(S_F(k)S^T_F(k))^{-1}S_F(k)$. Note that this is possible since $(S_F(k)S^T_F(k))$ is a square matrix, or (2) Singular Value Decomposition.

However, the direct computation of pseudo inverse typically requires advanced signal processors. An alternative method for determining the impairment values $W_d(k)$ is to use an iterative procedure such as the iterative least mean squares procedure. This iterative method indirectly solves the pseudo inverse.

The impairment values $W_d(k)$ for each frequency bin k can be written in recursive form as:

$$W_d(i+1,k)=W_d(i,k)+\mu(S_R(\text{mod}(i,M)+1,k))^*$$
$$[S_F(\text{mod}(i,M)+1,k)-S_R(\text{mod}(i,M)+1,k)W_d(i,k)]$$

where $i=\{0, 1, 2, \ldots N^{max}\}$ is the iteration index, $N^{max}$ is the maximum number of iterations and $\mu$ is the convergency constant. The notation * represents conjugation. The convergency constant $\mu$ controls the rate of convergence. An overly large constant causes the solution to diverge, and an overly small constant results in a large number of iterations before convergence. For example, a value of 0.05 is a good tradeoff.

FIG. 7 shows that the impairment values generated by the Generate and Solve Equation block 720 are multiplied by the previous (i.e., delayed) impairment values. The multiplication results are forwarded to a Synthesize Allpass Filter block 681. An inverse FFT 714 is applied to the current impairment values to obtain their corresponding time domain impairment values. FIG. 7 also shows that the previous time domain impairment values are convolved with the reference signals $s_R(p,m,n)$ for each transmit path. This means that the impairment estimation is performed before the outbound traffic signals are captured for use as the reference signals.

Step 4: Calculate the Occupied Signal Bandwidth. As the calibration uses live traffic signals, the calibration parameters can be accurately determined only in a frequency region where adequate signal power is present. This frequency region is referred to as the occupied signal bandwidth.

Figure 8A:
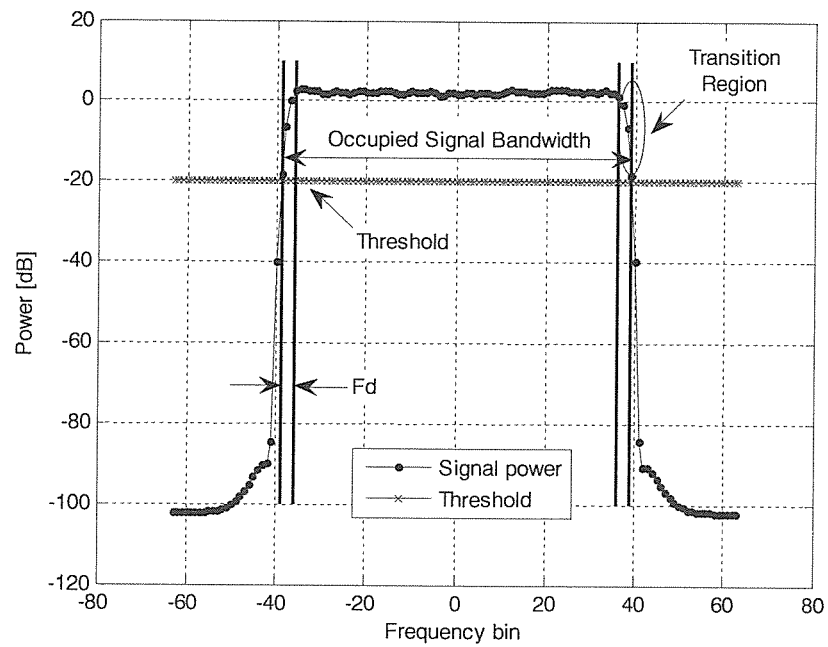
FIG. 8A illustrates an occupied frequency region according to one embodiment.

FIG. 8A illustrates an example of an occupied frequency region according to one embodiment. The occupied signal frequency region has a bandwidth that can be determined by applying a window (e.g., a Hamming raised cosine window) to the time-domain input data, and then performing an FFT. This is repeated $N^s$ times and averaged per frequency bin to remove the noise in the calculation. The frequency bins where the power of the spectrum is above a certain threshold $T^s$ (e.g., −20 dB in FIG. 3) is determined. There is also a frequency delta (Fd) transition region at the boundaries within the occupied bandwidth (shown as Fd in FIG. 3) where results of the impairment estimates are less accurate. The impairment estimates in general have amplitude and phase information. Typically only the phase information is used in equalization for the purpose of antenna calibration. For other applications, both magnitude and phase information of the impairment estimates may be used. To improve the accuracy in the transition region, extrapolation technique may be used as described in the next step.

Figure 8B:
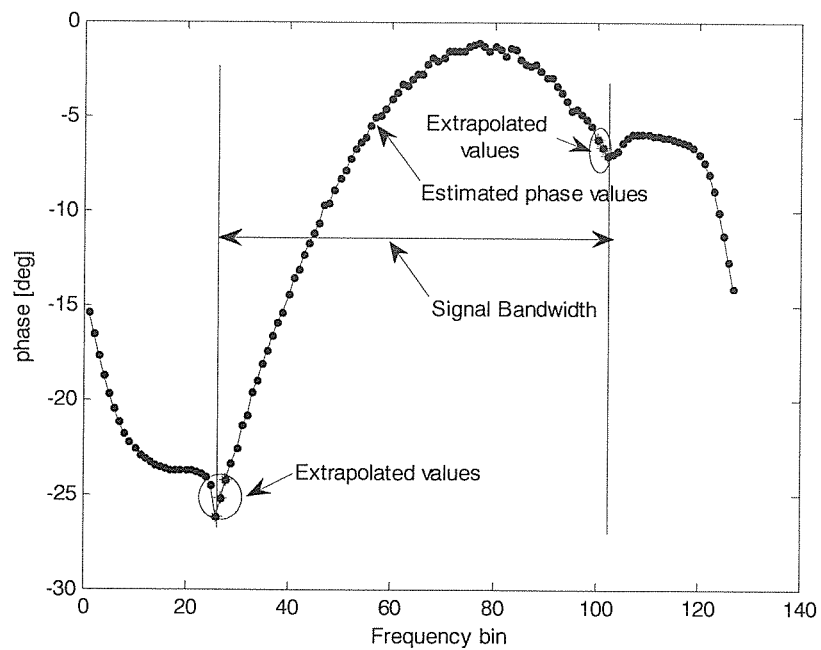
FIG. 8B illustrates extrapolated phase data in a transition region according to one embodiment.

Step 5: Extrapolating the Impairment Phase in the Transition Region. In the transition region of the occupied signal bandwidth, the phase estimation becomes inaccurate. Thus, the estimated phase data can be extrapolated in the transition region as shown in the example of FIG. 8B.

In one embodiment, the extrapolation can be performed by determining, for example, a fourth-order fit to the in-band part (That is, the occupied frequency region minus the transition region) of the estimated impairment phase function. The five coefficients of the fourth-order function can be determined with an algorithm such as the Nelder-Mead algorithm. This algorithm adjusts the five coefficients to minimize the mean square error (MSE) between the fourth order-phase function and the estimated in-band impairment function.

Step 6: Synthesize All-Pass Filter (APF) 681 (FIG. 6). An APF is a signal processing filter that passes all frequencies equally, but changes the phase relationship between various frequencies. Once the impairment transfer function has been estimated, an L-tap (L<M) APF with tap weights $w_a$ is determined. The frequency response of this APF best matches (e.g., minimizing the MSE of) the estimated impairment in the occupied frequency region.

Figure 9:
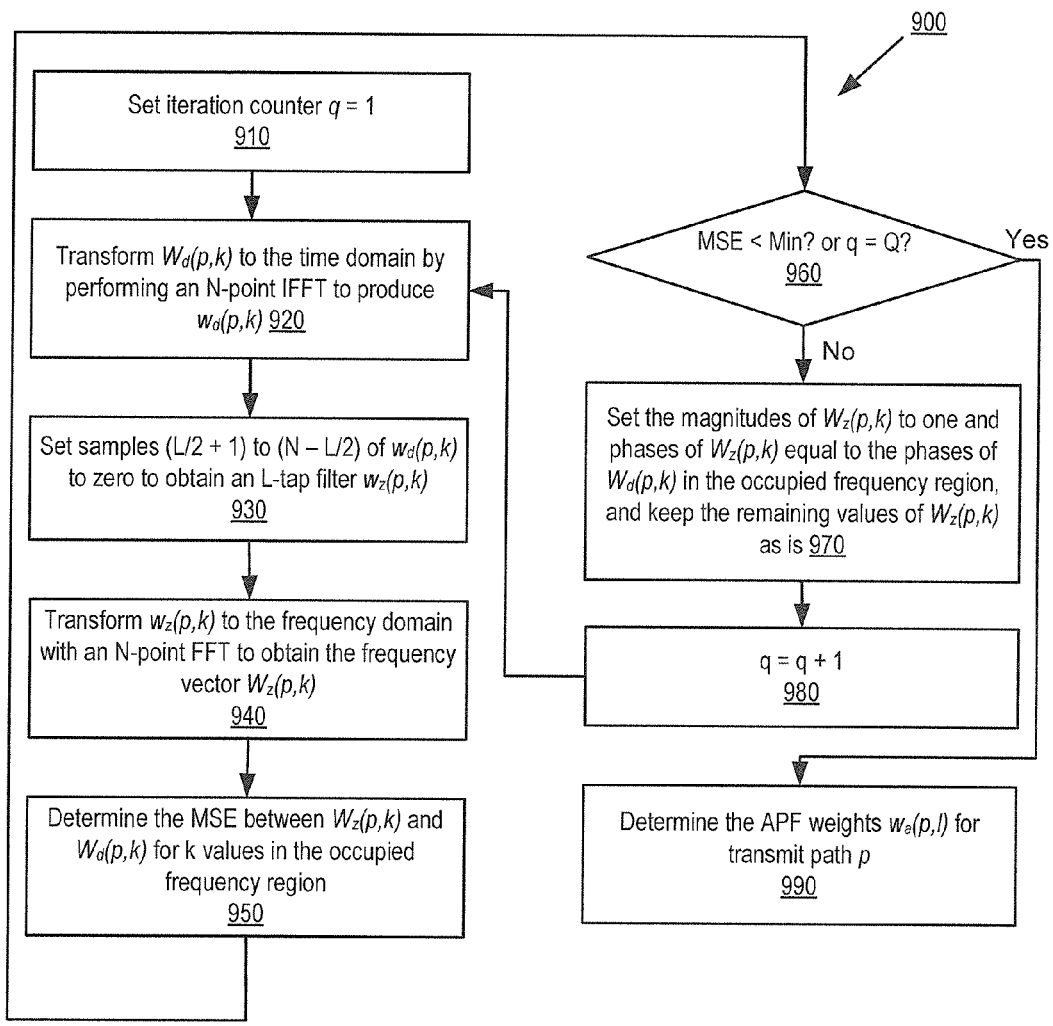
FIG. 9 is a flow diagram illustrating an iterative method for determining the weights of an all-pass filter according to one embodiment.

FIG. 9 is a flow diagram illustrating an iterative method 900 for determining the APF weights $W_a(p,k)$ for each transmit path p, according to one embodiment. The method comprises the following operations:

Initially, set the iteration counter q to one (block 910).

Transform the frequency domain impairment values $W_d(p, k)$ to the time domain by performing an N-point IFFT to produce $w_d(p,k)$ (block 920).

Set samples (L/2+1) to (N−L/2) of $w_d(p,k)$ to zero to obtain an L-tap filter $w_z(p,k)$ (block 930).

Transform $w_z(p,k)$ to the frequency domain with an N-point FFT to obtain the frequency vector $W_z(p,k)$ (block 940).

Determine the MSE between $W_z(p,k)$ and $W_d(p,k)$ for k values in the occupied frequency region (block 950).

If the MSE is below a desired minimum or the maximum number of iterations q=Q has been achieved, then proceed to block 990 below. Otherwise, continue to block 970 below (block 960).

Set the magnitudes of $W_z(p,k)$ to one and phases of $W_z(p,k)$ equal to the phases of $W_d(p,k)$ in the occupied frequency region, and keep the remaining values of $W_z(p,k)$ as is (block 970).

Set the iteration counter q=q+1 and repeat the operations from block 920 to block 960 (block 980).

Determine the APF weights $w_a(p,l)$ for transmit path p, with l={1, 2, ..., L} (block 990), by:

(1) Performing an N-point IFFT on $W_d(p,k)$ (2) For each transmit path p, mapping the $w_d(n)$ samples of so that the peak is at the center to obtain $$w_{map}(n) = \begin{cases} w_d(N/2+n); & n \leq N/2 \\ w_d(n); & n > N/2 \end{cases},$$

where n={1, 2, ..., N}

(3) For each transmit path p, select the L middle values to obtain the APF weights as follows: $w_a(l)=w_{map}((N-L)/2+1+l)$.

Step 7: Remove common phase response from all-pass filters. This is an optional step; it is performed if relative calibration is necessary. For each frequency bin, this step subtracts the mean of the phases of all transmit paths from the phases of each transmit path.

Step 8: Determine Equalizer Taps 682 (also referred to as equalizer weights in FIG. 6). The equalizer taps $W_{eq}(p,l)$ for transmit path p is the inverse of $W_a(p,l)$, since it is desired that $w_{eq}*w_a$ is an impulse. However, as $W_a(p,l)$ is an APF, the magnitude of $W_a(p,l)=1$ for l={1, 2, ..., L}, and thus the inverse is the conjugate. Therefore, the equalizer taps are: $w_{eq}(p,l)=\text{IFFT}\{[W_a(p,l)]^*\}$.

Figure 10:
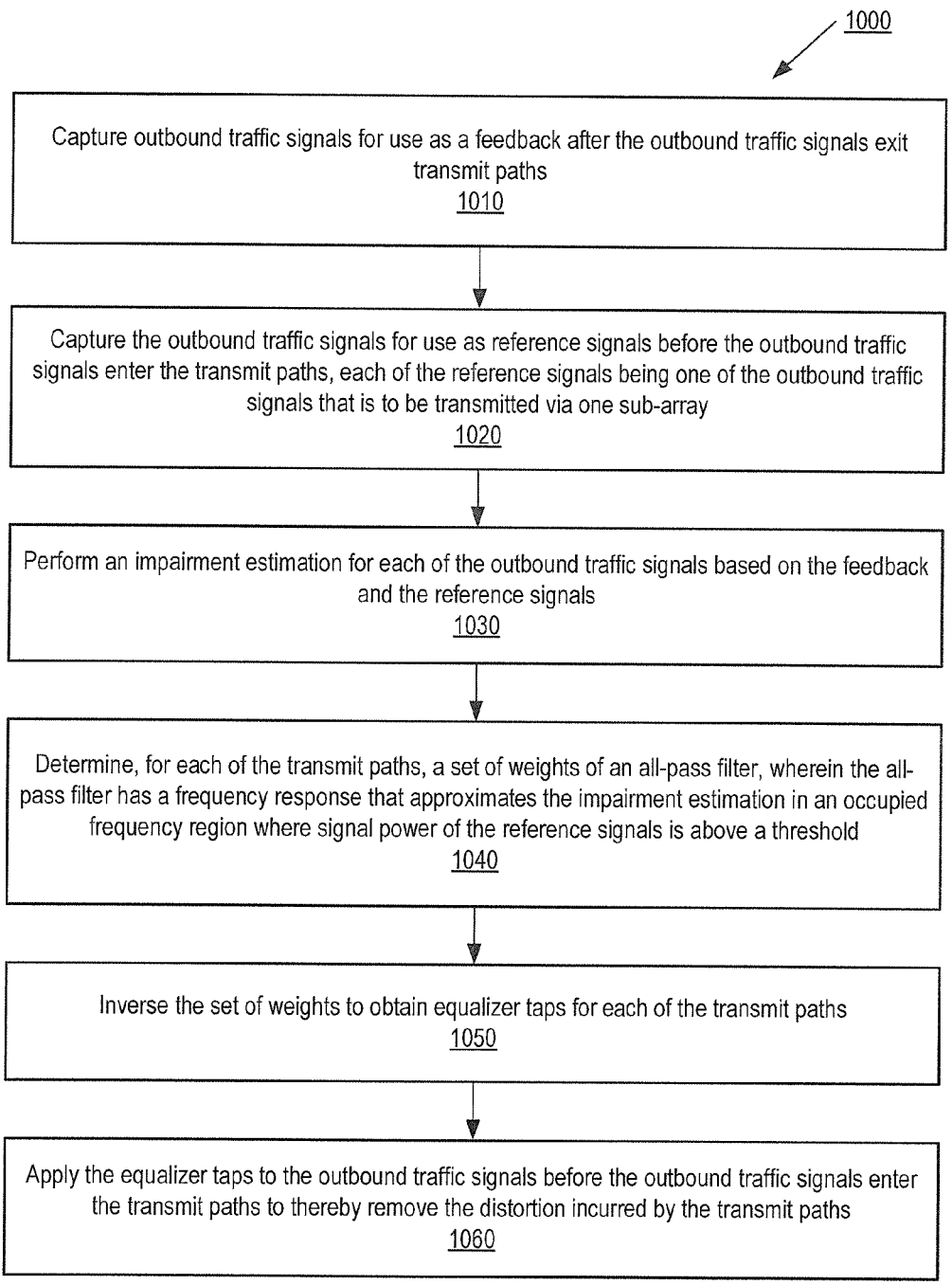
FIG. 10 is a flow diagram illustrating a method of antenna array calibration using outbound traffic signals according to one embodiment.

FIG. 10 illustrates a method 1000 for antenna array calibration according to one embodiment. The method 1000 may be performed by the embodiment of the base station described above with reference to FIGS. 1-4, 6 and 7. In one embodiment, an antenna array of the base station includes a plurality of sub-arrays coupled to the transmit paths in the radio unit for transmitting outbound traffic signals to a wireless network. The outbound traffic signals are captured for use as a feedback after they exit the transmit paths (block 1010). The outbound traffic signals are captured for use as reference signals before they enter the transmit paths (block 1020). Each of the reference signals is one of the outbound traffic signals to be transmitted via one of the sub-arrays. An impairment estimator of the base station estimates the impairment for each of the outbound traffic signals based on the feedback and the reference signals (block 1030). The base station also determines a set of weights of an all-pass filter for each transmit path, where the all-pass filter has a frequency response that approximates the impairment estimation in an occupied frequency region where signal power of the reference signals is above a threshold (block 1040). The base station inverses the set of weights to obtain equalizer taps for each transmit path (block 1050). The base station applies the equalizer taps to the outbound traffic signals before the outbound traffic signals enter the transmit paths to thereby remove the distortion incurred by the transmit paths (block 1060). In one embodiment, the feedback is a single feedback signal formed by combining the outbound traffic signals in the sub-arrays. In another embodiment, the feedback is a feedback signal for each transmit path.

The operations of the diagrams of FIGS. 5, 9 and 10 have been described with reference to the exemplary embodiments of FIGS. 1-4, 6 and 7. However, it should be understood that the operations of the diagrams of FIGS. 5, 9 and 10 can be performed by embodiments of the invention other than those discussed with reference to FIGS. 1-4, 6 and 7, and the embodiments discussed with reference to FIGS. 1-4, 6 and 7 can perform operations different from those discussed with reference to the diagram of FIGS. 5, 9 and 10. While the diagram of FIG. 5 shows a particular order of operations performed by certain embodiments of the invention, it should be understood that such order is exemplary (e.g., alternative embodiments may perform the operations in a different order, combine certain operations, overlap certain operations, etc.).

Different embodiments of the invention may be implemented using different combinations of software, firmware, and/or hardware. Thus, the techniques shown in the figures can be implemented using code and data stored and executed on one or more electronic devices (e.g., an end station, a network node). Such electronic devices store and transmit (internally and/or with other electronic devices over a network) code (composed of software instructions) and data using computer-readable media, such as non-transitory tangible computer-readable media (e.g., computer-readable storage media such as magnetic disks; optical disks; read only memory; flash memory devices) and transitory computer-readable transmission media (e.g., electrical, optical, acoustical or other form of propagated signals—such as carrier waves, infrared signals). In addition, such electronic devices typically include a set of one or more processors coupled to one or more other components, such as one or more non-transitory machine-readable media (to store code and/or data), user input/output devices (e.g., a keyboard, a touchscreen, and/or a display), and network connections (to transmit code and/or data using propagating signals). The coupling of the set of processors and other components is typically through one or more busses and bridges (also termed as bus controllers). Thus, a non-transitory computer-readable medium of a given electronic device typically stores instructions for execution on one or more processors of that electronic device. One or more parts of an embodiment of the invention may be implemented using different combinations of software, firmware, and/or hardware As used herein, a network node (e.g., a router, switch, bridge, controller, base station) is a piece of networking equipment, including hardware and software, that communicatively interconnects other equipment on the network (e.g., other network nodes, user equipment, etc.). Some network nodes are "multiple services network nodes" that provide support for multiple networking functions (e.g., routing, bridging, switching, Layer 2 aggregation, session border control, Quality of Service, and/or subscriber management), and/or provide support for multiple application services (e.g., data, voice, and video).

While the invention has been described in terms of several embodiments, those skilled in the art will recognize that the invention is not limited to the embodiments described; it can be practiced with modification and alteration within the scope of the appended claims. The description is thus to be regarded as illustrative instead of limiting.

What is claimed is:

1. A method for calibrating an antenna array of a base station to remove distortion incurred by transmit paths in the base station, the antenna array including a plurality of sub-arrays coupled to the transmit paths for transmitting outbound traffic signals to a wireless network, the method comprising the steps of:
    capturing the outbound traffic signals for use as a feedback after the outbound traffic signals exit the transmit paths;
    capturing the outbound traffic signals for use as reference signals before the outbound traffic signals enter the transmit paths, each of the reference signals being one of the outbound traffic signals that is to be transmitted via one of the sub-arrays;
    performing an impairment estimation for each of the outbound traffic signals based on the feedback and the reference signals;
    determining, for each of the transmit paths, a set of weights of an all-pass filter, wherein the all-pass filter has a frequency response that approximates the impairment estimation in an occupied frequency region where signal power of the reference signals is above a threshold;
    inversing the set of weights to obtain equalizer taps for each of the transmit paths; and
    applying the equalizer taps to the outbound traffic signals before the outbound traffic signals enter the transmit paths to thereby remove the distortion incurred by the transmit paths.

2. The method of claim 1, further comprising the step of: capturing the outbound traffic signals in respective ones of the sub-arrays into a single feedback signal for the transmit paths.

3. The method of claim 1, wherein the feedback comprises a feedback signal for each transmit path.

4. The method of claim 1, wherein performing the impairment estimation further comprises the steps of:
    applying a time-domain window to each of M blocks of the feedback and the reference signals, where M>P, P being the number of transmit paths; and
    generating and solving M equations for each of frequency bins in a frequency domain to obtain the impairment estimation in the frequency domain.

5. The method of claim 1, wherein performing the impairment estimation further comprises the step of aligning the feedback and the reference signals in time before performing the impairment estimation.

6. The method of claim 1, further comprising the steps of:
    detecting a correlation between the reference signals; and
    using the equalizer taps to add a phase variation as a function of time to the outbound traffic signals such that the outbound traffic signals have a relative phase that is changing at different points of time.

7. The method of claim 1, further comprising the steps of:
    identifying the occupied frequency region where the signal power of the reference signals is above the threshold:
    identifying a transition region at a boundary of the occupied frequency region; and
    extrapolating phase values of the impairment estimation in the transition region .

8. The method of claim 1, wherein the step of applying the impairment estimation is performed before the outbound traffic signals are captured for use as the reference signals.

9. The method of claim 1, further comprising the steps of:
    synthesizing a plurality of all-pass filters with each all-pass filter for one transmit path; and
    removing a common phase response from the all-pass filters.

10. The method of claim 1, further comprising the step of: computing a conjugate of the set of weights of the all-pass filter in a frequency domain to obtain the equalizer taps.

11. The method of claim 1, wherein one or more of the steps of capturing, applying, determining, inversing and applying are performed in a baseband unit of the base station.

12. The method of claim 1, wherein determining the set of weights of the all-pass filter further comprises the steps of:
    transforming the impairment estimation $W_d(p,k)$ in a frequency domain to a time domain to produce $w_d(p,n)$ for transmit path p, wherein k is a frequency bin index and n is a time sample index;
    setting samples (L/2+1) to (N−L/2) of $w_d(p,k)$ to zero to obtain an L-tap filter $w_z(p,k)$, where L is the number of taps of the all-pass filter;
    transforming $w_z(p,k)$ to the frequency domain to obtain a frequency vector $W_z(p,k)$;
    determining the mean square error (MSE) between $W_z(p,k)$ and $W_d(p,k)$ for k frequency bins in the occupied frequency region;
    if the MSE is not below a minimum value, setting magnitudes of $W_z(p,k)$ to one and phases of $W_z(p,k)$ equal to the phases of $W_d(p,k)$ in the occupied frequency region, and keeping remaining values of $W_z(p,k)$ as is; and
    repeating the steps of transforming the impairment estimation, setting the samples, transforming $w_z(p,k)$ to the frequency domain, determining the MSE and setting the magnitudes until the MSE is below the minimum value.

13. A base station that performs calibration of an antenna array to remove distortion incurred by transmit paths in the base station, the antenna array including a plurality of sub-arrays coupled to the transmit paths for transmitting outbound traffic signals to a wireless network, the base station comprising:

a feedback receiver adapted to receive a feedback of the outbound traffic signals after the outbound traffic signals exit the transmit paths;

an impairment estimator coupled to the feedback receiver, the impairment estimator adapted to receive the outbound traffic signals that are captured before entering the transmit paths for use as reference signals, and to perform an impairment estimation for each of the outbound traffic signals based on the feedback from the feedback receiver and the reference signals, wherein each of the reference signals is one of the outbound traffic signals that is to be transmitted via one of the sub-arrays;

a synthesizer coupled to the impairment estimator to determine a set of weights of an all-pass filter for each transmit path and to inverse the set of weights to obtain equalizer taps for each transmit path, wherein the all-pass filter has a frequency response that approximates the impairment estimation in an occupied frequency region where signal power of the reference signals is above a threshold;

a plurality of equalizers coupled to the synthesizer with one equalizer for each transmit path, each equalizer adapted to apply the equalizer taps to the outbound traffic signals for one of the transmit path before the outbound traffic signals enter the transmit paths to thereby remove the distortion incurred by the transmit paths.

14. The base station of claim 13, further comprising a combiner in the antenna array, the combiner adapted to combine the outbound traffic signals in respective ones of the sub-arrays into a signal feedback signal for the transmit paths.

15. The base station of claim 13, wherein the feedback comprises a feedback signal for each transmit path.

16. The base station of claim 13, wherein the impairment estimator is further adapted to:
apply a time-domain window to each of M blocks of the feedback and the reference signals, where M>P, P being the number of transmit paths; and
generate and solving m equations for each of frequency bins in a frequency domain to obtain the impairment estimation in the frequency domain.

17. The base station of claim 13, wherein the impairment estimator is further adapted to align the feedback and the reference signals in time before performing the impairment estimation.

18. The base station of claim 13, wherein the plurality of equalizers are adapted to add a phase variation as a function of time to the outbound traffic signals when a correlation is detected between the reference signals, such that the outbound traffic signals have a relative phase that is changing at different points of time.

19. The base station of claim 13, wherein the synthesizer is further adapted to:
identify the occupied frequency region where the signal power of the reference signals is above the threshold;
identify a transition region at a boundary of the occupied frequency region; and
extrapolate phase values of the impairment estimation in the transition region.

20. The base station of claim 13, wherein the plurality of impairment estimation is applied to the outbound traffic signals before the outbound traffic signals are captured for use as the reference signals.

21. The base station of claim 13, wherein the synthesizer is further adapted to:
synthesize a plurality of all-pass filters with each all-pass filter for one transmit path; and
remove a common phase response from the all-pass filters.

22. The base station of claim 13, wherein the synthesizer is further adapted to compute a conjugate of the set of weights of the all-pass filter in a frequency domain to obtain the equalizer taps.

23. The base station of claim 13, wherein the synthesizer is further adapted to:
transform the impairment estimation $W_d(p,k)$ in a frequency domain to a time domain to produce $w_d(p,n)$ for transmit path p, wherein k is a frequency bin index and n is a time sample index;
set samples $(L/2+1)$ to $(N-L/2)$ of $w_d(p,k)$ to zero to obtain an L-tap filter $w_z(p,k)$, where L is the number of taps of the all-pass filter;
transform $w_z(p,k)$ to the frequency domain to obtain a frequency vector $W_z(p,k)$;
determine the mean square error (MSE) between $W_z(p,k)$ and $W_d(p,k)$ for k frequency bins in the occupied frequency region;
if the MSE is not below a minimum value, set magnitudes of $W_z(p,k)$ to one and phases of $W_z(p,k)$ equal to the phases of $W_d(p,k)$ in the occupied frequency region, and keep remaining values of $W_z(p,k)$ as is; and
repeat operations of transforming the impairment estimation, setting the samples, transforming $w_z(p,k)$ to the frequency domain, determining the MSE and setting the magnitudes until the MSE is below the minimum value.

* * * * *